(12) United States Patent
Goddard

(10) Patent No.: US 6,698,952 B1
(45) Date of Patent: Mar. 2, 2004

(54) HAND HELD ENCODING INSTRUMENT

(76) Inventor: Stephen A. A. Goddard, 1548 Liholiho St., Apt. 205 Honolulu, HI (US) 96822

( * ) Notice: Subject to any disclaimer, the term of this patent is extended or adjusted under 35 U.S.C. 154(b) by 1,144 days.

(21) Appl. No.: 07/982,949

(22) Filed: Feb. 22, 1993

(51) Int. Cl.[7] .................................................. B41J 3/39
(52) U.S. Cl. .......................... 400/88; 200/5 R; 400/489
(58) Field of Search ............................... 200/5 R, 52 R, 200/502; 235/10, 145 R; 345/156, 157, 168, 169; 364/709.1, 709.12; 400/485, 488, 489, 88, 87; 341/21, 22; D14/147, 148

(56) References Cited

U.S. PATENT DOCUMENTS

| | | | | |
|---|---|---|---|---|
| 4,020,527 A | * | 5/1977 | O'Neill | 235/1 D X |
| 4,065,650 A | * | 12/1977 | Lou | 200/5 R |
| 4,324,976 A | * | 4/1982 | Lapeyre | 235/145 R |
| 4,517,424 A | * | 5/1985 | Kroczynski | 200/52 R |
| 4,584,443 A | * | 4/1986 | Yaeger | 200/6 A |
| 4,791,408 A | * | 12/1988 | Heusinkveld | 400/479 X |
| 4,971,465 A | * | 11/1990 | Hashimoto | 400/485 |
| 5,267,181 A | * | 11/1993 | George | 364/709.12 |
| 5,270,709 A | * | 12/1993 | Niklsbacher | 400/489 X |
| 5,332,322 A | * | 7/1994 | Gambaro | 400/489 |
| 5,361,083 A | * | 11/1994 | Pollack | 345/169 |

* cited by examiner

*Primary Examiner*—Anthony H. Nguyen

(57) ABSTRACT

An encoding instrument held in substantially the palmar axis of a hand has a concavo-curved keypad surface accessibly equidistant to the thumb of the holding hand. The primary surface of the keypad is substantially not coincidental with a handle. Encoding switches mounted on the keypad are connected by cable or wireless signal transmission to operate selected functions. A movement control device mounted at the thumb end of the handle is operated by the thumb of the holding hand. Analog switch movement is positively and negatively manipulated by digit fingers of the holding hand.

7 Claims, 3 Drawing Sheets

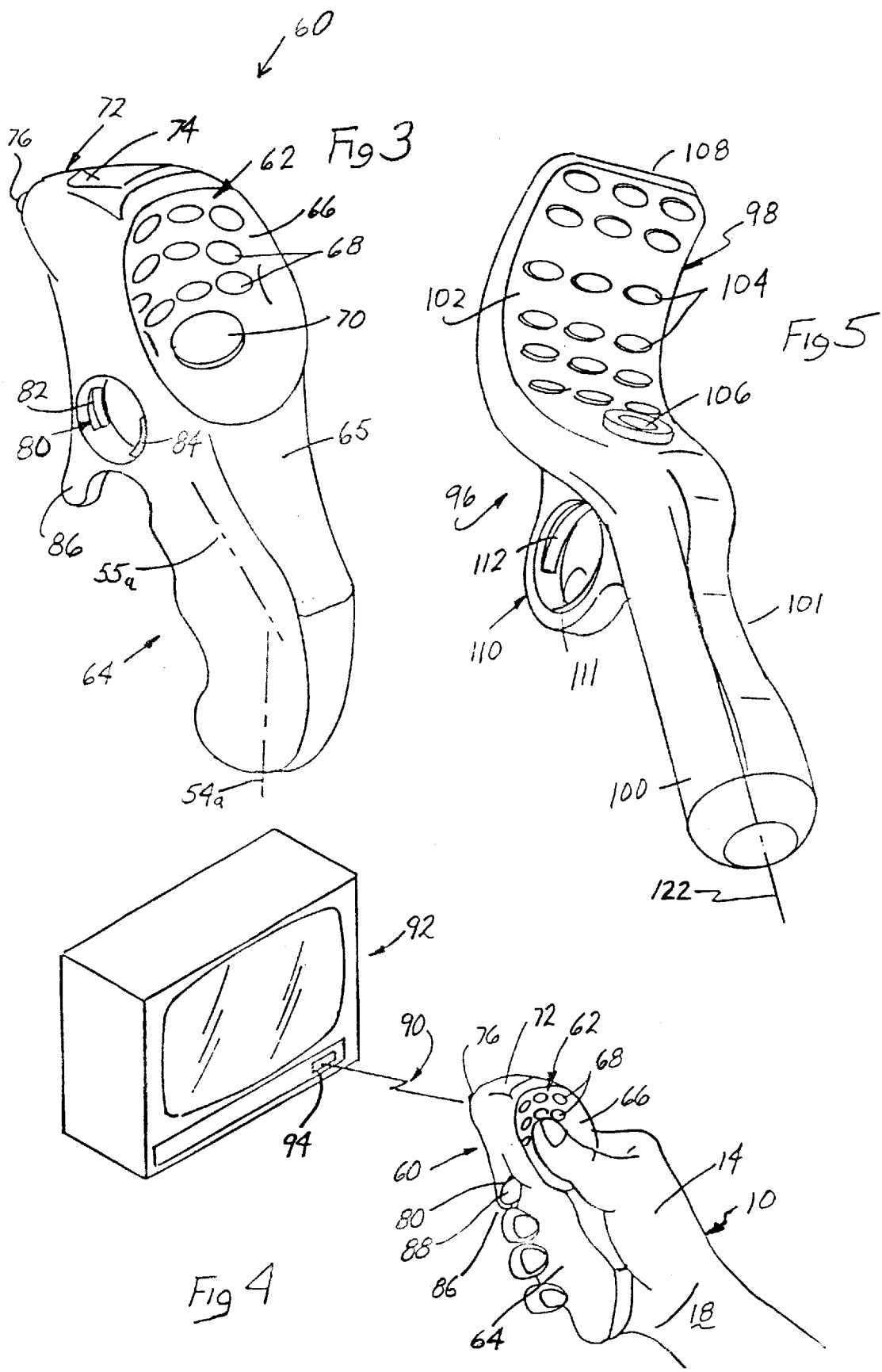

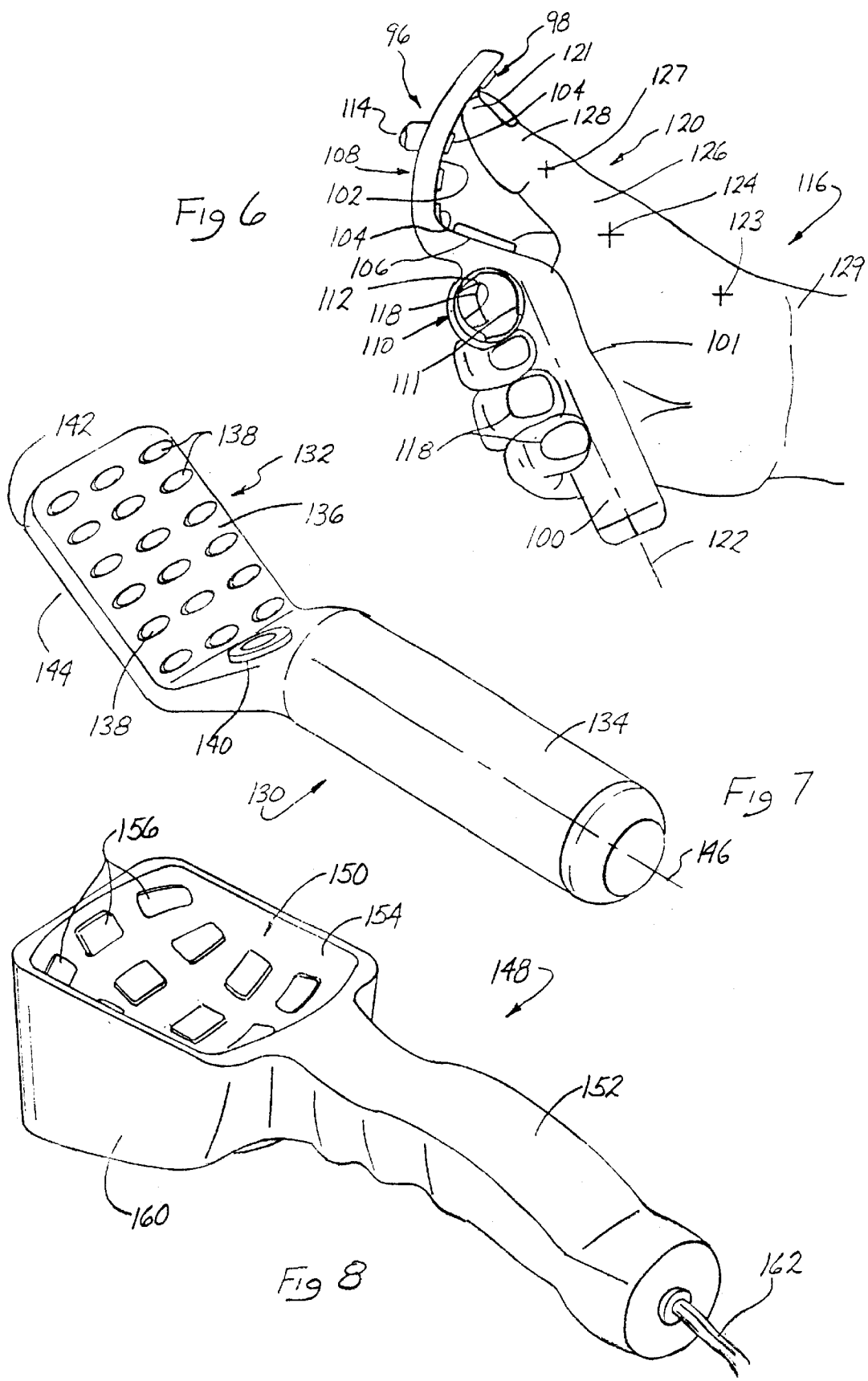

HAND HELD ENCODING INSTRUMENT

BACKGROUND OF THE INVENTION

1. Field of the Invention

The present invention relates to the art of encoding instruments, and more particularly to one-handed encoding, controller and communication instruments.

2. Description of the Prior Art

In the past, it has been known to provide encoding, controller, and communication instruments designed to be held by a single hand and having thereon a plurality of switching elements, such as, for example, switch buttons. Such instruments are usually connected in remote circuit with other units such that there is switch signal transmitting interaction between the instruments and such other units.

Hereinafter, in this specification, the term "encoder", or perhaps "encoding instrument", or "encoding device", will be used generally to refer to such instruments, even though the specific application may be for communications, such as a cellular telephone set, or for a controller, such as a remote controller for, e.g., a television set.

One such device may be representatively seen in U.S. Pat. No. 4,517,424, which shows an encoding instrument operated by short digital movements within an encircling frame. Another representative example of such encoding instrument may be seen in U.S. Pat. No. 4,620,287 having finger operated switches mounted to an adjustable handle. See also the table mounted one-hand encoding device shown in U.S. Pat. No. 4,260,892.

In the past, it has also been known to use encoding instruments designed to be grasped by a hand having switch or switches operable by the thumb. A representative example of such an instrument can be seen in U.S. Pat. No. 4,739,128 which shows an operating control stick, sometimes called a "joystick," having multiple-position switches designed to be operated by a thumb. Such thumb-operated encoding instruments have only a limited number of switch positions or control options which can be selected.

In none of these devices is there shown a hand-held encoding instrument described having control switches or buttons positioned for "non-retraction" access by digits or thumb with movements beginning from the digits repose position. Hereinafter in this Specification, the term "digit" will be used to include the thumb of a hand unless otherwise specified, but the term "finger" will be used to exclude the thumb of a hand.

It has been found that "retraction" of the thumb as well as fingers is stressful, awkward and slow. In this Specification, the term "retraction" is used to mean movement of the tip of a digit in approximately a straight line toward the base of such digit; i.e., toward the metacarpal-phalangeal joint for the four fingers, and toward the metacarpal-carpal joint for the thumb. Such "retraction involves a simultaneous extension and/or abduction of the proximal segment of the digit and flexion of the two distal segments of the digit.

In anatomical terminology, when the extensor brevis pollices extends the metacarpus, the extensor longus pollices will, unless opposed by the flexor pollices longus, act in concert to extend the two phalanxes. Meanwhile, flexion of the distal phalanx by the flexor pollices longus is accompanied by flexion of the medial phalanx by the flexor pollices brevis and the adductor pollices. As the tendon sheaths of the flexor pollices brevis are anchored at the metacarpal-phalangeal or knuckle joint, flexion of the phalanxes produces flexion of the metacarpus. In fact, flexion of the metacarpus is normally produced by the flexor pollices brevis acting at the metacarpal-phalangeal joint. See, for example, W. Henry Hollinshead, *Functional Anatomy of the Limbs and Back* (2nd ed., 1962) (W. B. Saunders Co., Philadelphia. Pa.), at pp. 192–94; and, M. Gladys Scott, Analysis of Human Motion (2nd ed., 1962) (Appleton-Century Crofts, New York), at pp. 241–42.

"Retraction" involves flexing the two distal segments of a digit while extending the proximal segment, which causes different muscle groups and tendons to work in opposition to one another. This type of motion is accordingly quite stressful, awkward, and slow, especially compared to the more normal simultaneous flexion or extension of all segments of a digit. Unfortunately, "retraction" is required for one-handed operation of current controller and encoding devices; such as, for representative example, a remote controller for a television set. Such instruments invariably have switches or keys mounted on a flat keypad and are designed with no handle or with a handle that is substantially coincident with the plane of the keypad. If the hand is positioned so that the thumb can reach to top keys, for example, the thumb must "retract" in order to operate the bottom or closer keys; i.e., the keys more proximal the wrist.

Furthermore, operation of the current television set remote controllers and other such instruments also requires ulnar flexion or palmar flexion of the wrist; that is, bending the wrist downward at an uncomfortable angle, in order to align an infrared controller beam with the controlled device, such as a television set.

It has long been sought to have an encoder instrument which is easy to operate while being lightly held and balanced in the hand with the wrist in a substantially straight, repose position. Further, it is desired to have such an encoder instrument held by a single hand which can switch or operate a number of switched functions comparable to the number of switched functions manipulated by a standard alpha-numeric key-board while having operating switch buttons accessible to the digits of the holding hand without "retraction," as that term is used herein, of the thumb and, additionally, without "retraction" of the fingers as well.

SUMMARY

In brief, in accordance with one aspect of the present invention, an encoding instrument is described having a handle and a keypad surface with switch buttons or keys mounted on the surface. The handle is ergonomically shaped to be held by a holding hand in substantial repose while keys mounted on the surface of the keypad may be operated by the thumb of the holding hand without retracting the thumb. The keys on the keypad are positioned, in one aspect, in a, concavo-curved surface which is substantially equidistant from the centers of rotation and articulation of the thumb digit, or pollex of the holding hand. Finger operated switches, which may be digital or analog, are mounted on opposing sides of a finger hole or holes to be operated selectively by a finger digit inserted through the finger hole or holes.

At or near the position where the tip of the thumb rests on the thumb keypad is mounted a movement control device, hereinafter called a "prime mover." The prime mover allows for a movement of a cursor or other position indicating device in any direction on a substantially planar surface, such as a television screen. Such a prime mover may also be used to select different items from a menu appearing on such a planar surface, such as, for examples, a television screen or display screen.

The encoding instrument may have an internal processing and memory unit and may have a transmitter for transmitting the electrical signals resulting from the switch or key manipulation through an infrared carrier optical beam or radio signal generated within the encoding instrument. The encoding instrument may be fitted with a display which indicates the switching as selected to the view of the person whose hand is holding the encoding instrument.

In an alternative embodiment, the keypad has a less concavo-curved surface and has a surface that is substantially not curved in a width dimension. The planar surface is substantially tangential to the arc defined by the tip of a thumb as the thumb is flexed and extended in a plane substantially coincidental with the upper axis of the handle being gripped by the hand of the thumb. The planar surface is substantially tangential to a point of the arc defined by the tip of a thumb as it is articulated around its joints. In another alternative embodiment, the keypad is described having a substantially planar surface which is tangential to the median point of the arc described in the above concavo-curved surface. In yet another alternative embodiment, the switched signal transmissions can be made through electrical cable conduits, such as light or optical fibers, conducting wire, and the like.

These and other novel aspects of the present invention, together with other aspects thereof, can be better understood by the following detailed description of the preferred embodiments, which are designed to be read in conjunction and together with the accompanying drawings.

BRIEF DESCRIPTION OF THE DRAWINGS

FIG. 3 is a perspective view of a controller instrument of the preferred embodiment of the present invention;

FIG. 4 is a perspective view showing the controller instrument of the preferred embodiment of FIG. 3 being held by a hand and positioned in operative placement in relation to a controlled device;

FIG. 5 is a perspective view of an alternative embodiment of the present invention showing an encoding instrument having a curved keypad surface;

FIG. 6 is a side elevational view of the alternative embodiment of FIG. 5 having a holding hand shown in position relative to the encoding instrument;

FIG. 7 is a perspective view of another alternative embodiment of the present invention having a substantially planar keypad surface not co-incidental with the axis of the handle; and, FIG. 8 is a perspective view of yet another alternative embodiment of the present invention showing an encoding instrument connected by cable.

DETAILED DESCRIPTION OF THE PREFERRED EMBODIMENTS

Figure 1:
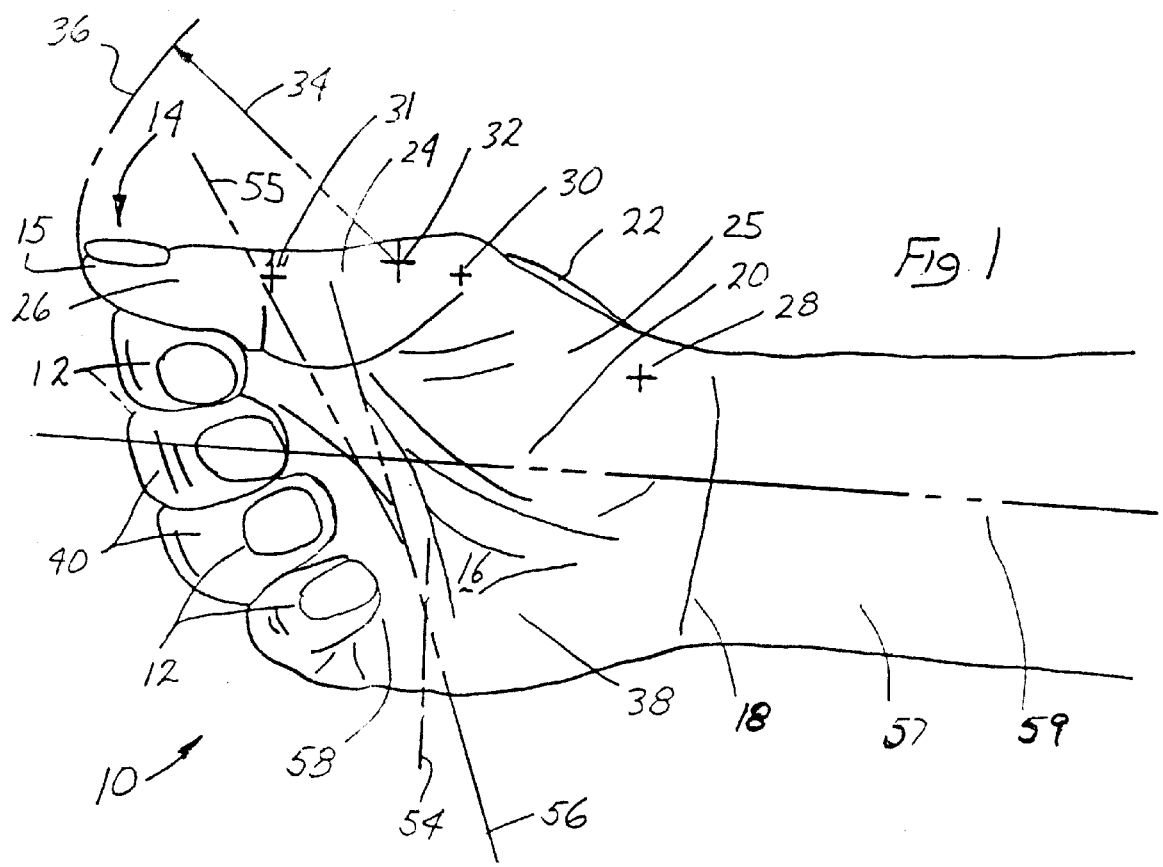
FIG. 1 is a side palmar elevation of a human hand in repose showing the palm face forward.

The present invention can best be described by an understanding of certain elements and aspects of the human hand, reference being had initially to FIGS. 1 through 4 of the accompanying drawings. A human hand 10 is shown having the distal phalanxes 12 of the four fingers in repose with the pollex or thumb 14 resting on the index finger and having the palm 16 facing. The carpus or wrist 18 connects the hand 10 to the forearm, described in greater detail below. The thumb 14 comprises a tip 15. The thumb 14 also comprises a thenar eminence, or sometimes simply "thenar" 20, which is the muscle group connecting the metacarpus of the thumb 14 to the palm 16 of the hand 10 which provides for strength and movement of the thumb 14 in flexion. A dorsal thenar 22, which allows extension of the thumb 14, is also seen partially in FIG. 1.

In addition to the thenar 20, the thumb comprises a proximal phalanx 24 and a distal phalanx 26, the tip 15 of which is the outward most extremity of the thumb 14. The metacarpus 25 joins the proximal phalanx 24 of the thumb 14 to the carpus or wrist 18. A carpal-metacarpal or "saddle" joint 28 provides the moving connection between the thumb's metacarpus 25 and the carpus 18. A metacarpal-phalangeal joint 30 provides the moving joint between the thumb's proximal phalanx 24 and the metacarpus 25, while the inter-phalangeal joint 31 provides movement between the distal and proximal phalanxes of the thumb 14.

The thumb 14 has an extension-abduction and flexion-adduction movement vertically, as seen in the side elevation of FIG. 1. This vertical movement of the tip 15 of the thumb 14 is defined by the arc 36. The arc 36 is the range of movement of the outward thumb tip 15 in its vertical movement around its two hinge joints, namely the metacarpal-phalangeal or "thumb knuckle" joint 30 and its inter-phalangeal joint 31, and to a lesser degree, its carpal-metacarpal joint 28. In its movements about the joints 28, 30, 31, the thumb 14 maybe thought as having a vertical center of movement 32. As the arc 36 has a decreasing radius from the top to the bottom of the swing, as seen in FIG. 1, the center 32 of the arc 36 is only approximately located. The radius 34 of the thumb 14 movement will be the approximate distance between the vertical poll center 32 and the tip 15 of the thumb 14 through its vertical movement as seen in FIG. 1.

The hand 10 is also comprised of a hypothenar eminence, or simply hypothenar 38, which is the muscle group connecting the fourth or little finger with the palm 16. The hypothenar 38 provides for flexion-extension and abduction-adduction of the little finger.

Figure 2:
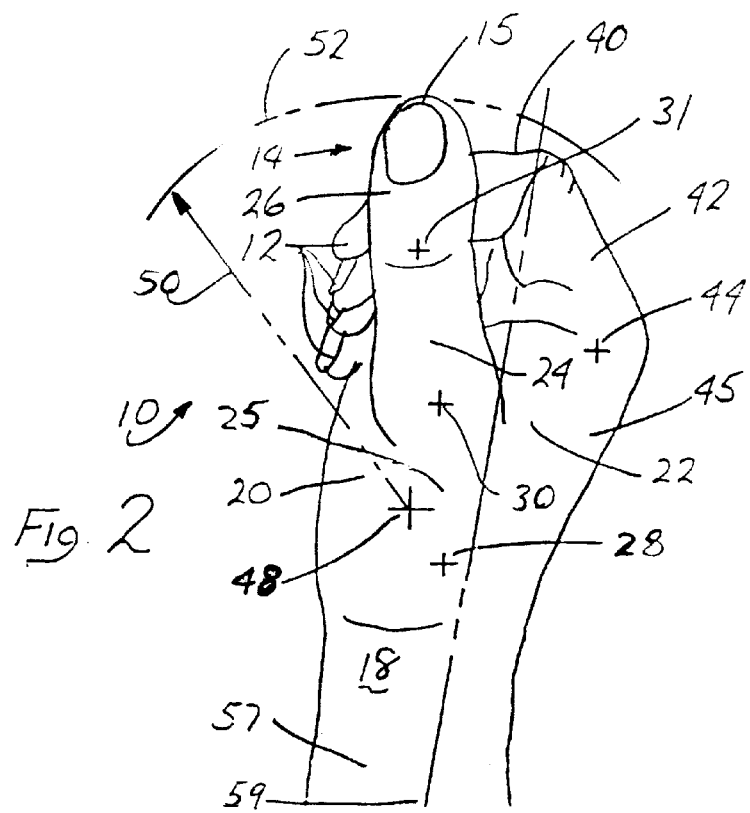
FIG. 2 is a side elevation of a human hand in repose having the thumb shown forward in repose resting on the index finger.

As better seen in FIG. 2, the fingers, in addition to the distal phalanxes 12, comprise medial phalanxes 40 and proximal phalanxes 42. The proximal phalanxes 42 of the fingers are connected to the metacarpi 45 by corresponding metacarpal-phalangeal or "knuckle" joints 44. On the palmar side of the base of the proximal phalanxes 42 of the fingers 12 are palmar finger pads 58, as will be better seen in FIGS. 1 and 2.

The thumb 14 also has a lateral or horizontal sweeping movement, as seen from the perspective in FIG. 2, defined by its movement about its saddle joint 28 and to a much lesser degree, the knuckle joint 30. These axes 28, 30 of movement allow the thumb 14 seemingly to move about a point near the saddle joint 28, which point is designated herein the horizontal poll axis 48. The thumb 14 moves as the radius 50 so that the tip 15 of the thumb 14 defines an arc 52. The radius 50 is substantially constant through its arc with a slight decrease in length near the ends of the arc 52 due to lateral movement at the thumb knuckle joint 30.

The hand 10 when flexing its digits, 12, 14 or when in general repose defines two griping axes within its palm 16, the hypothenar axis 54, between the palmar finger pads 58 and the hypothenar 38, and the thenar axis 55, between the palmar finger pads 58 and the thenar 20, as best seen in FIG. 1. When grasping a cylindrical object, the palm 16 will define a single palmar grip axis 56, which is generally the average of the hypothenar and the thenar grip axes 54, 55.

The position of the hand 10 in relationship to the forearm 57 is defined by the forearm axis 59. When the hand 10 is in repose, the wrist 18 is in slight ulnar flexion. Ulnar flexion of the wrist 18 is the bending of the wrist 18 and the consequent movement of the hand 10 toward the little finger side of the hand 10. Radial flexion is the bending of the wrist 18 and consequent movement of the hand 10 towards the thumb side. Bending the wrist 18 and moving the hand 10 toward the palmar side of the hand 10 is called palmar flexion. Bending the wrist 18 and moving the hand 10 away from the palmar side of the hand 10 is called dorsal flexion. In this specification, "abduction" is defined as any movement of the hand 10, digits 12, 14 or any limb away from its "duct" or centerline, while "adduction" is defined as any movement of the hand 10, digits 12, 14 or any limb toward its "duct" or centerline.

In repose, the slight ulnar flexion results in the forearm axis 59 passing through the lateral edge of the middle finger at the inter-phalangeal joint between its proximal and medial segments. From this position, further ulnar flexion of the wrist 18 is limited and stressful. Radial flexion from this repose position has a much greater range and is less stressful.

As better seen in FIG. 3, the hand encoding instrument 60 of the present invention is comprised of a keypad 62 and a handle 64. The handle 64 is shaped having a thenar grip axis 55a, a hypothenar grip axis 54a, and a thenar swale 65 to accommodate a thenar eminence. The keypad 62 has a keypad surface 66 having keys or switch buttons 68 mounted thereon. In addition, a disc switch 70, which may act as prime mover, is positioned at the bottom center of the keypad 62 in substantially the position occupied by the thumb tip 15 when the thumb 14 is held in repose. The keypad 62 is mounted upon a head cabinet 72. The head cabinet 72 includes a display screen 74 formed in the head cabinet 72 so that when the encoding instrument 60 is held in a hand 10, the person holding the encoding instrument 60 can view the screen 74. The head cabinet 72 also has a lens 76 through which an infrared light beam 90 can be focused toward a receiving instrument, such as a television set 92 as better seen in FIG. 4, which is to be controlled by the encoding instrument 60.

The remainder of the cabinet of the encoding instrument 60 includes a handle 64 with a finger hole 80 positioned to receive the distal phalanx 12 of the index finger of the hand 10. The finger hole 80 has an anterior, rear-facing, inner surface with a reverse eye key 82 mounted therein. On the forward-facing, posterior inner surface of the finger hole 80 is an eye key 84. Both the reverse eye key 82 and the eye key 84 are intended to be operated by a finger inserted through the finger hole 80. A beak 86 depends from the front rim of the finger hole 80 so that pressure by a digit against the posterior surface of the beak 86 counter-balances the forward-pitch of the encoding instrument 60 caused by pressure of a thumb on the thumb keypad 62.

The keypad surface 66 has a concavo-curved surface, the shape of which is defined in accordance with the movement of the tip 15 of a thumb 14 through its movements about the axes 32, 48 through the arcs 36, 52. The keys 68 of the keypad 62 should be operatively accessible to the tip 15 of the thumb 14 when the thumb is in substantial repose and when the thumb 14 is moved about its axes 32, 48 without retracting. Thus, the outward most tip 15 of the thumb 14 can reach the keys 68 without retraction by movement through the arcs 36, 52 and through arcs defined by the intermediate planes between the planes defined by the arcs 36, 52 shown in FIGS. 1 and 2.

The shape of the keypad surface 66 thus should be formed so that the surface is equidistant from the axes 32, 48 through all movements of the tip 15 of the thumb 14. In addition, a disk-shaped switch, hereinafter disc switch 70, is positioned at the base of the keypad 62 to be operated by the thumb 14 without retraction of the thumb 14. The disc switch 70 may be movable in 360 degrees in its substantially planar mounting surface so that the switch 70 can be used as a prime mover 70. Each key or switch button 68, 70 mounted on the keypad 62 is connected in circuit to generate a signal when depressed. The prime mover 70 can be a sliding disc switch, "track ball," "joy-stick," or any other switching device that moves freely in a planar or hemispherical manner to control a cursor or position indicating device. The prime mover switch 70 essentially moves in a continuous movement for generating an analog electrical signal responsive to the analog movement of the switch 70.

As seen in FIG. 4, the electrical signal is then modulated upon an optical beam, such as an infrared light beam 90, which is focused through lens 76 to the instrument to be controlled, such as the television set 92. The signal thus transmitted upon the optical beam 90 is decoded within the controlled instrument 92 and caused to switch a predetermined circuit to actuate the functions selected.

The index finger 88 inserted through the finger hole 80 can operate the reverse eye key 82, as better seen in FIG. 3, by depressing the eye key 82 by extension of the distal phalanx 12 of that finger 88. The eye key 84 can be operated by the same finger 88 as inserted through the finger hole 80 by flexion of that finger 88. The keys 82, 84 can be analog electrically so that the extension and flexion of the distal phalanx 12 of the operating finger 88 can be moved incrementally to incrementally switch the circuits controlled by the keys 82, 84.

As better seen in FIG. 4, the handle 64 is formed in relation with the keypad surface 66 and the head cabinet 72 so that the encoding instrument 60 can be held by the hand 10 without ulnar flexion of the wrist 18. Thus, the hand 10 can grasp the handle 64 so that the handle 64 occupies substantially the palm of the hand 10. The handle 64 is aligned generally along the palmar grip axis 56 of the hand 10. It may then be appreciated that the optical beam 90 through the lens 76 can be aligned with the receiver instrument, such as a television set 92 as shown in FIG. 4, without ulnar flexion, radial flexion, or otherwise contorting the wrist 18. Rather, the wrist 18 will continue to have its normal repose position relative to the hand 10, all the while the thumb 14 can be easily flexed, extended and rotated without retraction and while substantially in its repose position to operate all of the keys 68 on the keypad 62. Thus, the instrument to be controlled by the encoding instrument 60 is fully operated without having to abduct, flex, extend, or otherwise contort the wrist 18.

The handle 64 may be thought to have a generally longitudinal dimension defined by the extent of its length about which the palm 16 of the hand 10 grasps the handle 64 by flexing the fingers. When the handle 64 is thus grasped, the longitudinal dimension will be substantially co-incidental with the palmar grip axis 56. Planes tangential to the keypad surface 66 will be, in the present invention, generally non-coincidental with the longitudinal dimension of the handle 64.

In FIG. 4, the encoding instrument 60 is shown in positional relation to a television set 92 which is representative of an instrument or device to be controlled. The encoding instrument 60 is shown being grasped by a hand 10 having its thumb 14 in substantial repose and accessing the keys 68 of keypad 62. The fingers of the hand 10 grasp around the handle 64, with the index finger 88 being inserted through the finger hole 80 and dorsal side of the distal phalanx of the second finger nestled against the beak 86.

The head 72 of the cabinet is shown with the lens 76 through which is focused an infrared optical light beam 90 generated by the circuit housed within the head 72 and where electronic circuitry is controlled by the keys 68. The television set 92 has a light receiving lens 94 through which the beam 90 is received. The lens 94 is part of a circuit system within the television set 92 which de-couples the signals carried on the light beam 90 and selectively operates the functions of the television set 92 in accordance with the selection of the keys 68 depressed or switched by application of pressure of the tip 15 of the thumb 14 of the holding hand 10. As may be appreciated, the thumb 14 can depress any key 68 while the hand 10 holds the handle 64 of the encoding instrument 60, without the necessity of retracting the thumb 14. The thumb disc switch or prime mover switch 70, as seen better in FIG. 3, is positioned where the thumb tip 15 rests when the hand 10 is in repose. Further, as may be better seen in FIG. 4, the signals carried by the beam 90 can be transmitted to the television set 92 without the necessity of abducting, flexing, or otherwise contorting the wrist 18 of the hand 10.

In operation, a hand 10 grasps the hand-held instrument 60 by flexing the fingers around the handle 64, leaving the thumb 14 in repose. The index finger is inserted through the finger hole 80, while the middle finger is nestled between the handle 64 and the beak 86. The thumb 14 in repose has its tip 15 capable of reaching the keys 68 on the keypad surface 66 without retraction. The lens 76 can be aimed so that the light beam 90 is directed toward the light receiving lens 94 of the television set 92 without abducting, flexing or otherwise contorting the wrist or carpus 18 of the hand 10. The disc switch 70 can be operated by the distal phalanx 26 of the thumb 14, such disc switch 70 being so designed that is can be switched in several directions, such as forward and rearward, laterally side-to-side, etc, with minimal movement of the thumb 14.

The reverse eye key 82 can be operated by extension of the index finger which is inserted through the finger hole 80. Similarly, the eye key 84 can be operated by flexion of the index finger threaded through the finger hole 80. The keys 68 can be operated by depressing the keys 68 with the tip 15 of the thumb 14. The curve of the keypad surface 66 allows access to each of the keys 68 to the tip 15 of the thumb 14 without retraction of the thumb 14. Depending on the angle of the key 68 to the thumb 14, the keys 68 may be depressed by movement of the thumb 14 from the poll axes 32, 48, or may require a slight extension and retraction of the thumb tip 15.

In FIGS. 5 and 6, an alternative embodiment of the encoding instrument of the present invention is shown in which an encoding instrument 96 has a keypad 98 and a handle 100. The handle 100 has a thenar swale 101 to accommodate the thenar eminence. The keypad 98 has a keypad surface 102 with a plurality of keys 104 mounted thereon. A disc switch or prime mover 106 is also mounted through the keypad surface 102 at a point at which the thumb tip 121 of the distal phalanx of the thumb 128 occupies when the thumb 128 is in repose. The keypad 98 is mounted within a head cabinet 108, in which electronic circuitry is placed in operative connection with the keys 104, 106.

The handle 100 is formed with a finger hole 110 adapted to receive one of the fingers of the holding hand 116, as will be described in greater detail herein below. The finger hole 110 has mounted within its posterior, forward-facing, inner side an eye key 111 adapted to be operated by flexion of the distal phalanx of the finger 118 inserted through the finger hole 110. The finger hole 110 also has mounted within its anterior, rear-facing inner surface a reverse eye key 112 adapted to be operated by extension of the distal phalanx of the inserted finger 118.

The electronic circuitry is operatively connected so that signals generated by operation of the keys 104, 106 will be modulated upon an optical transmission beam focused through the lens 114. The encoding instrument 96 is designed to be operated with an instrument to be controlled, which has optical transmission beam receiving circuitry to receive the beam transmitted through the lens 114 and to switch circuits according to the selection made when operating the keys 104, 106, 111, 112.

The encoding instrument 96 is grasped, as seen in the view of FIG. 6, by wrapping the fingers of the hand 116 around the handle 100, which has a longitudinal axis or dimension 122. The keypad surface 102 has a shape so that the keys will be accessible to the tip 121 of the thumb 120 by flexion and extension of the thumb 120 at the thumb knuckle joint 124, and to a lesser degree, the interphalangeal joint 127 and saddle joint 123 of the thumb 120. Flexion of the thumb 120 to near the repose position allows engagement and operation of the disc switch or key 106 by the thumb tip 121.

In operation, the encoding instrument 96 of this embodiment is grasped by the hand 116 by flexing the distal phalanxes 118 and other portions of the fingers around the handle 100 so that the palmar grip axis of the hand 116 is substantially co-incidental with the longitudinal dimension 122 of the handle 100. The curved keypad surface 102 of the keypad 98 is curved in a parabolic shape in cross section. The width dimension of the keypad surface 102 is not curved. The curve of the keypad surface 102 is formed so that a center line taken along the longitudinal direction will be defined by the movement of the tip 121 of the thumb 120 when the hand 116 grasps the handle 100 and the thumb tip 121 is moved by flexing and extending the thumb 120 through a vertical plane as seen in FIG. 6. The reverse eye key 112 is operated by extension of the distal phalanx 118 of the finger inserted through the finger hole 110, while the eye key 111 is operated by flexion of the distal phalanx. The switches 111, 112 may be either digital or analog, according to the circuit design choices needed when designing the instrument.

It can be appreciated that the encoding instrument 96 is grasped by a hand 116 without abduction of the wrist 129 relative to the hand 116. Rather, the wrist 129 is in substantial repose as is the hand 116 itself when grasping the encoding instrument 96, and when operating the encoding instrument 96 as well.

The keys 104, 106 are accessed by flexion and extension of the thumb 120 without retraction, and the keys 111, 112 are accessed and operated by flexion and extension of a finger inserted through the finger hole 110.

In FIG. 7, yet another alternative embodiment of the present invention is shown. An encoding instrument 130 has a keypad 132 and handle 134. The keypad 132 comprises a keypad surface 136 having depressible keys 138 mounted therethrough. The keys 138 are selectively connected in circuit when depressed within the head cabinet 142 so that when the keys 138 are depressed, a circuit is completed to generate a predetermined signal. The signal is modulated upon an optical beam which is focused through a lens 144 for transmission to a receiving instrument, not shown. A disc switch or prime mover 140 is positioned to be operatively contacted by the tip or pad of the thumb of a hand grasping the encoding instrument 130 about the handle 134.

The encoding instrument 130 has a longitudinal dimension defined by the cylindrically shaped handle 134 having an axis 146. The keypad surface 136 is substantially planar, the plane of which is not co-incidental with, and forms an angle with the axis 146 of and is tilted towards the handle 134 so that the keypad surface 136 is tilted toward the portion of the handle 134 facing the thenar eminence when the hand grasps the handle as in the embodiment seen in FIG. 6.

In FIG. 8, still another alternative embodiment of the present invention is shown, comprising an encoding instrument 148. The encoding instrument 148 includes a keypad 150 and a handle 152. The keypad 150 has a, concavo-curved keypad surface 154. Keys 156 are selectively connected to electrical circuitry mounted within head cabinet 160 for connection of electrical circuits when the corresponding key 156 is depressed or contacted by a thumb of the hand grasping the handle 152. The electrical circuitry within the head cabinet 160 generates a signal corresponding to a particular corresponding key 156 when the key 156 is operatively contacted by the thumb of the holding hand. The signal thus generated is transmitted through cable 162, which could be an optical fiber or collection of optical fibers, or an electrically conductive medium such as a copper wire. The cable 162 is connected to an instrument to be controlled by the encoding instrument 148.

In operation, a hand grasps the handle 152 so that the thumb of the hand in substantial repose will be positioned within the depression formed by the keypad surface 154 so that the thumb tip can operatively contact the keys 156 by movement of the thumb about its inter-phalangeal, knuckle and saddle joint axes without retraction of the thumb tip.

Yet other and further alternative embodiments may be perceived by those skilled in the art. For example, the keypad and handle combination of the present invention may have digital electronic memory and central processing unit capability mounted within the handle and head cabinets for the keypads. In such alternative embodiments, operative contact with the keys can encode information into such memory. Further, those skilled in the art by using the principles of this invention will perceive other and additional configurations that will result in greater operator ease and speed and less stress upon the digits, hands and wrists when operating one-handed encoding instruments.

I claim:

1. A key and handle in combination comprising:
   a. a keypad having a keypad surface and having a plurality of switch means on said surface for selectively switching circuit connections leading from said keypad;
   b. a handle graspable by fingers and palm including thenar eminence of a hand and having a longitudinal dimension, a finger facing portion and thenar eminence facing portion, said handle being joined to said keypad and at least a portion of said keypad surface being positioned tilted toward said thenar eminence facing portion of said handle.

2. The keypad and handle combination of claim 1 wherein said keypad surface is substantially concave.

3. The keypad and handle combination of claim 1 wherein said keypad surface is substantially curved.

4. The keypad and handle combination of claim 1 wherein said keypad surface is substantially planar.

5. The keypad and handle combination of claim 1 further comprising a first finger switch means mounted on the finger facing portion of said handle, said switch means for selectively switching predetermined circuit connections leading from said handle, said switch means being graspable and operable by a finger of said hand.

6. The keypad and handle combination of claim 5 further comprising a plurality of said finger switch means mounted on the finger facing portion of said handle, said switch means for selectively switching predetermined circuit connections leading from said handle, each of said plurality of finger switch means being graspable and operable by a finger of said hand.

7. The keypad and handle combination of claim 5 wherein said first finger switch means comprises an incremental analog switch movable in response to flexion and in response to extension of a finger operating said switch means.

* * * * *